US008667599B2

United States Patent
Tsuboi

(10) Patent No.: US 8,667,599 B2
(45) Date of Patent: Mar. 4, 2014

(54) IMAGE FORMING APPARATUS HAVING A FUNCTION THAT IS VALIDATED BY INSTALLING A LICENSE AND METHOD THEREFOR

(75) Inventor: Masanori Tsuboi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 12/965,156

(22) Filed: Dec. 10, 2010

(65) Prior Publication Data

US 2011/0145928 A1  Jun. 16, 2011

(30) Foreign Application Priority Data

Dec. 16, 2009 (JP) ................................. 2009-285759

(51) Int. Cl.
G06F 7/04 (2006.01)
G06F 17/30 (2006.01)
H04N 7/16 (2011.01)

(52) U.S. Cl.
USPC ............................................ 726/26; 713/153

(58) Field of Classification Search
USPC ............ 713/156, 158, 173; 726/26, 156, 158; 705/59
See application file for complete search history.

(56) References Cited

U.S. PATENT DOCUMENTS

| 7,363,318 B1* | 4/2008 | Dere et al. ............................. 1/1 |
| 7,747,851 B1* | 6/2010 | Robinson et al. ............. 713/156 |
| 2004/0044901 A1* | 3/2004 | Serkowski et al. ........... 713/200 |
| 2009/0055935 A1* | 2/2009 | Tsurukawa ...................... 726/26 |
| 2009/0124374 A1* | 5/2009 | Patel ................................ 463/29 |
| 2009/0158295 A1* | 6/2009 | Burg et al. ..................... 718/108 |
| 2009/0228976 A1* | 9/2009 | Yamaguchi et al. ............. 726/16 |
| 2009/0228982 A1 | 9/2009 | Kobayashi |
| 2010/0115633 A1* | 5/2010 | Ryu et al. ......................... 726/31 |
| 2010/0293536 A1* | 11/2010 | Nikitin et al. ................. 717/168 |

FOREIGN PATENT DOCUMENTS

JP  2006-107468 A  4/2006

OTHER PUBLICATIONS

Tushkada; Robust license-plate recognition method for passing vehicles under outside environment ; Nov. 2000;vol. 49 , Issue: 6 pp. 2309-2319.*

* cited by examiner

Primary Examiner — Mohammad W Reza
Assistant Examiner — Monjour Rahim
(74) Attorney, Agent, or Firm — Canon USA, Inc., IP Division

(57) ABSTRACT

A multifunction peripheral is disclosed as an example of an image forming apparatus. The multifunction peripheral determines whether a license corresponding to a license identifier is present inside the image forming apparatus through a license management unit based on the license identifier corresponding to input license information. If the license is present inside the image forming apparatus, the license management unit as an example of the history determination unit determines whether there is any installation history of the license whose presence has been determined, on the image forming apparatus.

6 Claims, 5 Drawing Sheets

IMAGE FORMING APPARATUS HAVING A FUNCTION THAT IS VALIDATED BY INSTALLING A LICENSE AND METHOD THEREFOR

CROSS REFERENCE TO RELATED APPLICATIONS

This application claims priority from Japanese Patent Application No. 2009-285759 filed Dec. 16, 2009, which is hereby incorporated by reference herein in its entirety.

BACKGROUND OF THE INVENTION

1. Field of the Invention

The present invention relates to a technology to manage application licenses.

2. Description of the Related Art

An application license is a example of a license. The application license is an electronic data issued by a computer in accordance with, for example, agreement between a software application user and a software application provider that governs the usage or redistribution of the application. A typical license grants an end-user permission to use one or more copies of the application. Regarding distribution, there are devices which are connected to a network and on which an application with a license can be installed such as by downloading them to the devices via the network. There are also techniques that invalidate applications, configuration options, and licenses thereof by using a license issuing server (see, for example, Japanese Patent Application Laid-Open No. 2006-107468). According to Japanese Patent Application Laid-Open No. 2006-107468, a license is invalidated in order to transfer an application preinstalled on a device to another device.

According to Japanese Patent Application Laid-Open No. 2006-107468, when licenses should be invalidated, it is necessary to manually invalidate these licenses one by one. Moreover, for the prevention of unauthorized use, a history of installation and also a history of invalidation are left behind on a device.

Multifunction peripherals conventionally have no mechanism to delete a history so that an unauthorized operation without license cannot be easily performed on the market. Thus, if a mismatch occurs in a license management system, it is difficult for a serviceman or user to restore the system.

SUMMARY OF THE INVENTION

An image forming apparatus, having a function that is validated by installing a license, includes a checking unit, an installation history determination unit, and a deletion unit. The checking unit checks whether a license of a function of the image forming apparatus is installed when license information to restore the image forming apparatus to a state of factory shipment is input. The installation history determination unit determines whether there is any installation history of the license on the image forming apparatus if the checking unit confirms that the license is installed. The deletion unit invalidates the installed license and deletes the installation history if the installation history determination unit determines that there is an installation history of the license on the image forming apparatus. If the installation history determination unit determines that there is not an installation history of the license on the image forming apparatus, the deletion unit does not invalidate the license.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Components described in an exemplary embodiment are only illustrative and do not limit the scope of the present invention to such components only.

Figure 1:
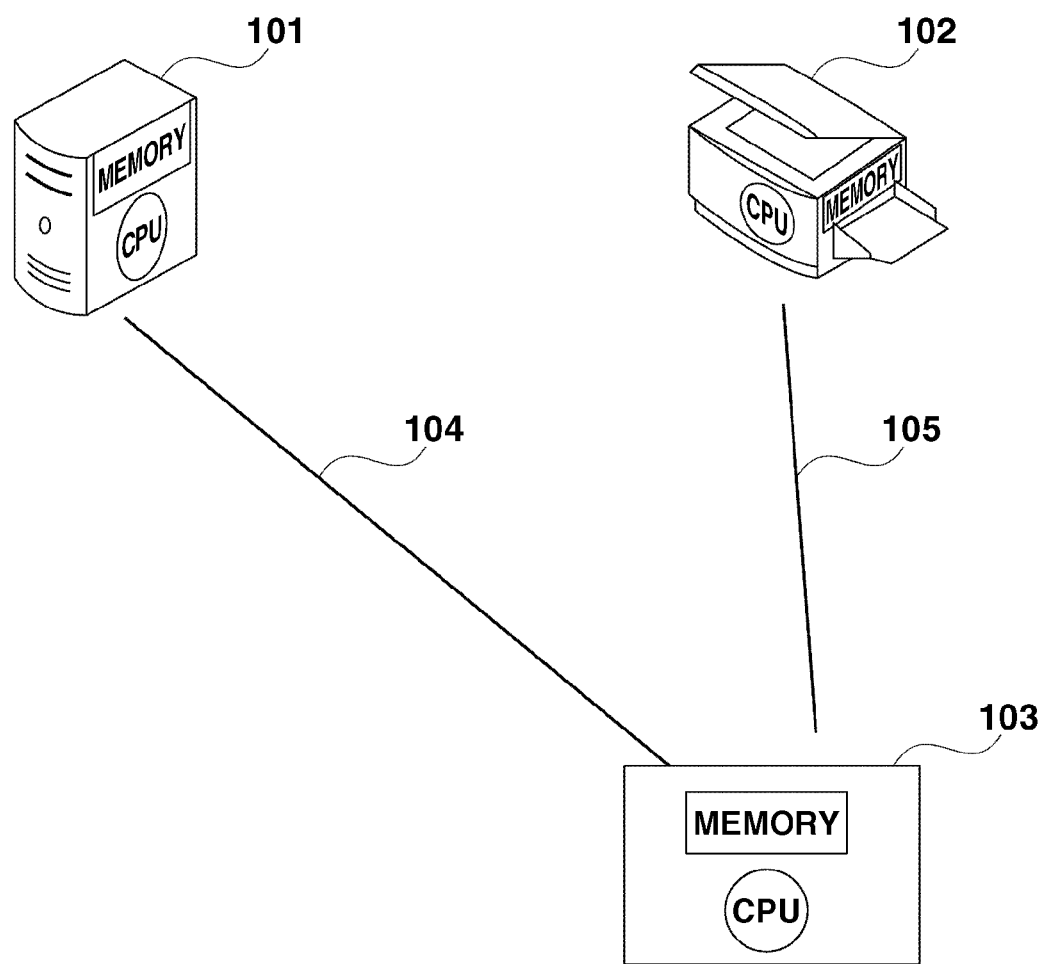
FIG. 1 is a system block diagram according to an exemplary embodiment.

FIG. 1 is a block diagram of a network system containing an information processing apparatus according to an exemplary embodiment.

In FIG. 1, a license issuing server 101 issues a license. A computer system provided in the license issuing server/content delivery server 101 configures a server access unit, number request unit, machine number recognition unit, content delivery confirmation request unit, machine number inspection unit, content delivery unit, options information registration unit, identifier generation unit, and identifier transmission unit.

A multifunction peripheral (MFP) 102 is a unit equipped with functions such as a printer, scanner, copying machine, and FAX. The MFP 102 is an example of an image forming apparatus. The MFP can have a plurality of applications and licenses installed thereon and has a device ID specific to the MFP. The MFP 102 is an MFP on which a license can be installed. A client apparatus 103 is an example of an information processing apparatus and is used to remotely perform an operation of the license issuing server 101 or the MFP 102.

A network 104 is the Internet or the like and the client apparatus 103 can connect to the content delivery server 101 via the network 104. Likewise, a network 105 is the Internet or the like and the client apparatus 103 can connect to the MFP 102 via the network 105.

Figure 2:
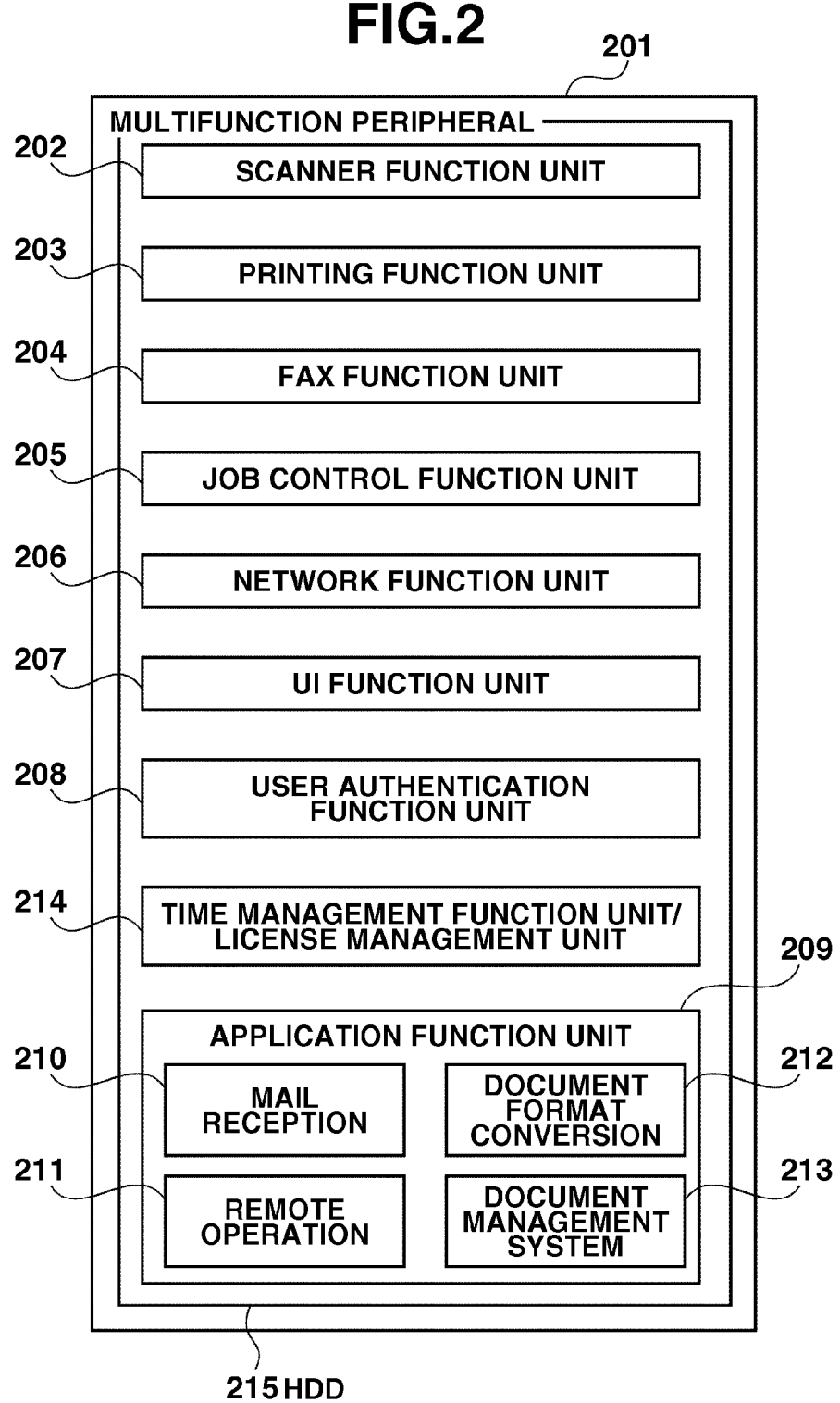
FIG. 2 is a function block diagram of a multifunction peripheral according to an exemplary embodiment.
Figure 4:
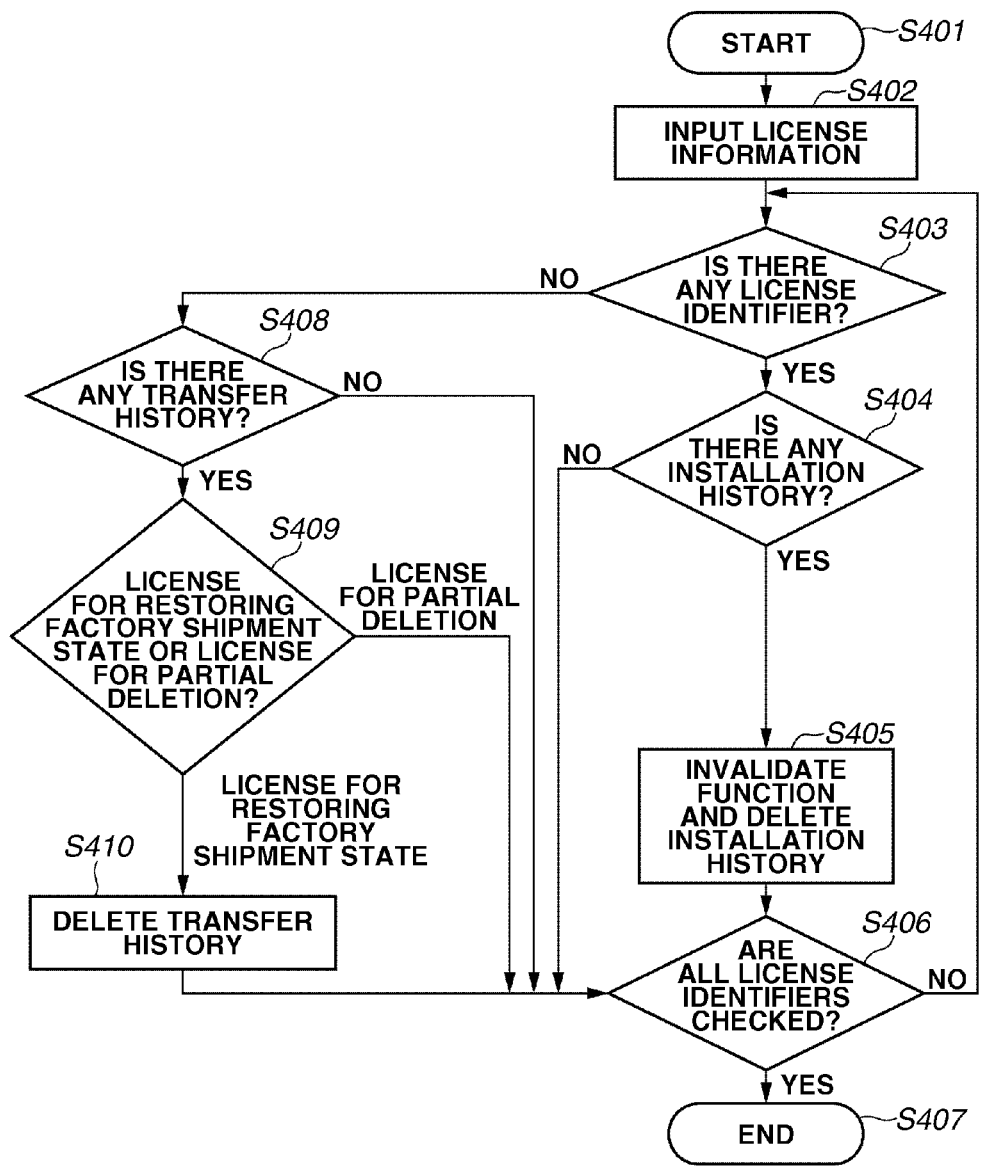
FIG. 4 is a flow chart diagram for installing license information according to an exemplary embodiment.

FIG. 1 schematically illustrates a portion of the hardware configuration. Each apparatus has a memory (nonvolatile or volatile) and one or more central processing units (CPUs) or micro processing units (MPUs). A control program that controls functions illustrated in FIG. 2 is stored in a memory inside the client apparatus 103. Then, the control program is read and executed by the CPU. Processing in FIG. 4 is thereby performed.

FIG. 2 is a function block diagram of a multifunction peripheral, which is an example of the image forming apparatus in the present exemplary embodiment. A multifunction peripheral 201 represents a first, second, or third multifunction peripheral. A scanner function unit 202 has a function to read a paper document to convert the document into binary image data. A printing function unit 203 has a function to output an image converted into binary image data after previously being read by the scanner function unit 202, to a printer device by adding commands for the printer. A FAX function unit 204 encodes an image converted into binary image data after previously being read by the scanner function unit 202 according to the FAX standard such as G3 and G4. The FAX function unit 204 also has a function to perform image communication with an external FAX based on a protocol according to the FAX standard. The FAX function unit 204 also has a function to transmit/receive a FAX image according to the FAX standard to/from the external FAX. A job control function unit 205 queues binary image data received from the scanner function unit 202 or FAX image data received by the FAX function unit 204 from outside as a print job. The job control function unit 205 has a job control function that successively outputs the signal to the printing function unit 203, the FAX function unit 204, and a network function unit 206 described below when appropriate. The network function unit 206 has a protocol function of various networks such as Transmission Control Protocol/Internet Protocol (TCP/IP), HyperText Transfer Protocol (HTTP), File Transfer Protocol (FTP), Lightweight Directory Access Protocol (LDAP), Simple Network Management Protocol (SNMP), Simple Mail Transfer Protocol (SMTP), and Secure Sockets Layer (SSL). A user interface (UI) function unit 207 manages input/output of an operation panel of the multifunction peripheral 201 by the user and displays an input field and output message field on the operation panel. The user interface function unit 207 also has a function to receive an input value in the input field from the user to notify other function units of the input value and to display messages from other functions units for the user in a pre-designed screen. A user authentication function unit 208 responds to user authentication requests of various applications inside an application function unit 209 by using the UI function unit 207 or an information terminal (not illustrated) in a network. More specifically, the user authentication function unit 208 sets various user authentication functions for each application by using a user authentication setting file. The user authentication function unit 208 also has a function to authenticate the user who operates various functions of a multifunction peripheral by using a user authentication server in a network or user authentication information inside the multifunction peripheral.

The application function unit 209 has functions to install, execute, and uninstall various applications that run on the multifunction peripheral 201 and to perform user authentication. The application function unit 209 also sets an expiration date of an application when the application is installed. Then, the application function unit 209 realizes an application with an expiration date by determining the expiration date preset during installation of the application by using the function of a time management unit 214 described below during execution of the application. The expiration date of an application may be set by storing expiration date information inside an application object or may be set as another object with additional information of the application during installation of the application. The present expiration date is indicated as the number of days before the application becomes inoperable after the installation. The expiration date may be the number of days indicating a term of validity or the date for expiration such as until what day of what month of what year. It is evident that even if the date for expiration is set, the number of days indicating the expiration date is calculated from a system clock inside the multifunction peripheral 201. The unit may be finer than the number of days and, for example, the unit of seconds may also be used. It is needless to say that if the unit is within the range of units of the system internal clock, the expiration date can be calculated. The present expiration date is delivered to an installation time setting function described below as an argument during installation of an application and stored in a nonvolatile storage area inside the multifunction peripheral 201.

For applications whose main body is already installed, among applications on the MFP, the function thereof can be validated only by installing a license thereof.

To use an application on the MFP, a validation procedure is needed after the application is installed. For the validation of an application, license information input from the user interface function unit is normally used. The license information contains the function type and the device ID to be validated. The license information may be input via a network by using the network function unit.

An application is validated by inputting license information into the MFP. Actually, a license identifier is stored in a nonvolatile storage area corresponding to each application inside the MFP.

Likewise, the application can be invalidated by deleting the license identifier thereof.

A mail application 210 is an application of the multifunction peripheral 201 running on the application function unit. The mail application 210 has a function to receive an electronic mail that is transmitted from an information terminal in a network and to which an electronic document is attached by using the network function unit 206, and to print the electronic mail by using the printing function unit. The mail application 210 also has a function to attach an electronic document read by using the scanner function unit 202, to an electronic mail to transmit the electronic mail to which the electronic document is attached, to a preset transfer destination. A remote operation application 211 is an application of the multifunction peripheral 201 running on the application function unit. The remote operation application 211 has a function to enable a remote operation by displaying the same interface as the touch panel of the main body, displayed on a multifunction peripheral, by using the UI function unit, in an information terminal (not illustrated) in a network. A document format conversion application 212 is an application of the multifunction peripheral 201 running on the application function unit. The document format conversion application 212 has a function to make a conversion to a preset electronic data format. Electronic data read by an operator using the scanner function unit 202 and electronic data transmitted from an information terminal in a network using the network function unit 206 are to be converted. A document management system application 213 is an application of the multifunction peripheral 201 running on the application function unit. The document management system application 213 has a function to store in a preset document storage space in a network or inside the main body of a multifunction peripheral. Electronic data read by a main body operation of an operator using the scanner function unit 202 and electronic data transmitted from an information terminal in a network using the network function unit 206 are to be stored.

The mail transmitting/receiving application 210, the remote operation application 211, the document format conversion application 212, and the document management system application 213 can perform user authentication. All these applications use the user authentication function unit 208 through the application function unit 209 when an operator uses an application.

The time management function unit 214 has a system internal clock and provides a system internal clock interface that can set the time to all function modules of the multifunction peripheral 201. The time management function unit 214 has a function to hold a cumulative setting differential time from the system start described below in a nonvolatile storage area such as a flash read-only memory (ROM). The time management function unit 214 also has a time setting function performed by a time synchronizing service in a network to which the multifunction peripheral 201 is connected. The time synchronizing service is a time synchronizing service using a protocol specified by the TIME protocol (Request for Comments (RFC) 868), the Network Time Protocol (NTP) protocol (RFC1305), the Simple Network Time Protocol (SNTP) protocol (RFC1769) or the like. Further, the time management function unit 214 has an installation time setting function when an application is installed as described below to determine the expiration date of an application including an expiration date.

Figure 3:
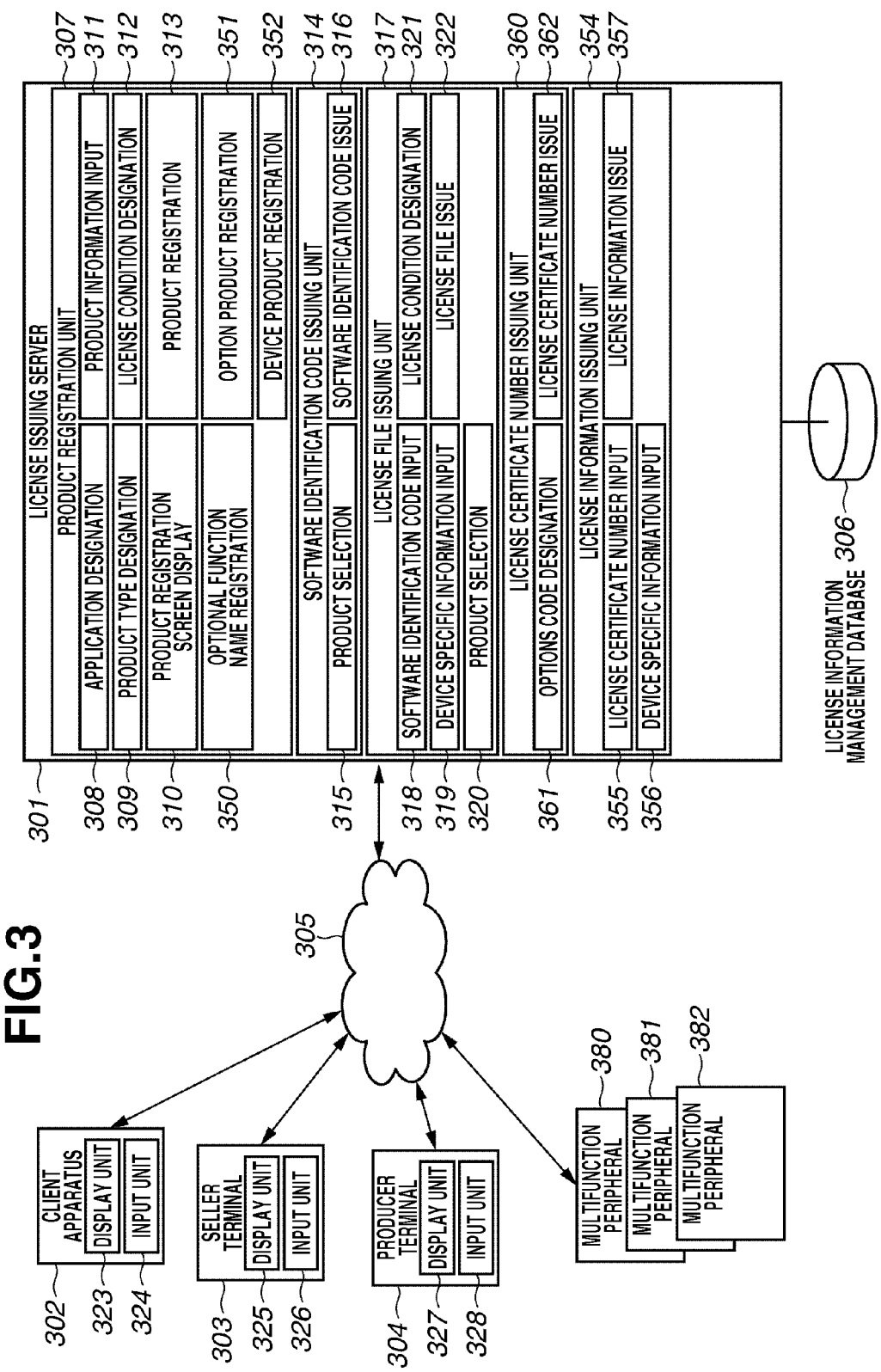
FIG. 3 is a block diagram of a license issuing server according to an exemplary embodiment.

In FIG. 3, a license issuing server 301 is an information processing apparatus that administers overall processing of issuing license information and corresponds to the license issuing server 101 in FIG. 1. A computer system provided in the license issuing server 301 configures a server access unit, number request unit, machine number recognition unit, license issue confirmation request unit, machine number inspection unit, license information issuing unit, options information registration unit, identifier generation unit, and identifier transmission unit.

A client apparatus 302 is an example of the information processing apparatus managed by the user. This apparatus corresponds to the client apparatus 103 in FIG. 1. Any information processing apparatus that can be connected to a network and on which software can be installed such as a personal computer, mobile terminal, printer, and copying machine can be the client apparatus 302. A computer system of the client apparatus 302 configures a server access unit, number transmission unit, and license information confirmation unit in the present exemplary embodiment.

A sales company terminal 303 is an information processing apparatus managed by a sales company and a software developer (producer) terminal 304 is an information processing apparatus managed by a software developer. A personal computer or workstation can be the sales company terminal 303 or the software developer terminal 304.

A network 305 is, for example, the Internet and the client apparatus 302, the sales company terminal 303, and the software developer terminal 304 are connected to the license issuing server 301 via the network 305.

In FIG. 3, multifunction peripherals 380, 381, and 382 have various applications running thereon with installed licenses issued by the license issuing server and correspond to the MFP 102 in FIG. 1. A plurality of multifunction peripherals is present and each multifunction peripheral communicates with a user terminal. Computer systems provided in the multifunction peripherals 380, 381, and 382 configure a scanner unit, printing unit, FAX transmitting/receiving unit, job control unit, network function unit, UI function unit, user authentication function unit, license management unit, Web application unit, and application function unit.

A license information management database 306 is connected to the license issuing server 301. This is a license information management database that stores application information, product information including license information, actor information, software identification code information, device-specific information, device product information, machine number data band information, application ID, device/product code association information, options product information, license certificate number information, license information, options information, and customer information.

A product registration unit 307 is contained in the license issuing server 301. The product registration unit 307 contains an application designation module 308, a product type designation module 309, a product registration screen display module 310, a product information input module 311, a license condition designation module 312, a product registration module 313, an options function name registration module 350, an options product registration module 351, and a device registration module 352.

A software identification code issuing unit 314 is contained in the license issuing server 301 and contains a product selection module 315, an options code designation module 353, and a software identification code issuing module 316.

A license file issuing unit 317 is contained in the license issuing server 301. The license file issuing unit 317 contains a software identification code input module 318, a device-specific information input module 319, a product selection module 320, a license condition designation module 321, and a license file issuing module 322.

A license certificate number issuing unit 360 is contained in the license issuing server 301 and issues a license certificate number. The license certificate number issuing unit 360 contains an option code designation module 361 that designates options to issue a license certificate number, and a license certificate number issuing module 362 that issues a license certificate number after the number to be acquired is input.

A license information issuing unit 354 is contained in the license issuing server 301 and includes a license certificate number input module 355, a device-specific information input module 356, and a license information issuing module 357.

A display unit 323 is contained in the client apparatus 302 and an input unit 324 is contained in the client apparatus 302. A display unit 325 is contained in the sales company terminal 303 and an input unit 326 is contained in the sales company terminal. A display unit 327 is contained in the software developer terminal 304 and an input unit 328 is contained in the software developer terminal.

Installation of a license issued by the license issuing server 301 is needed when a user uses software managed by the present system in an information processing apparatus. In other words, a license issued by the license issuing server 301 needs to be put in place when a user uses software managed by the present system in an information processing apparatus. The license issuing server 301 issues license information when accessed properly via the network 305.

Identification information specific to an information processing apparatus at an installation destination of software may be embedded in license information. When the same software is installed on another apparatus, it is necessary to issue different license information. Duplication without permission of software can thereby be prevented.

The flow of installation of a license in the present exemplary embodiment will be described below in detail.

Types of license to be installed based on license information input in step 402 of the present processing include two types: a license for restoring factory shipment state and a license for partial deletion. The license for restoring factory shipment state is a license that restores license bits inside the MFP 102 to the factory shipment state and deletes both the installation history and transfer history. When, for example, a used multifunction peripheral is restored, this license information for restoring factory shipment state is applied. Restoring an apparatus to a state of factory shipment includes returning license bits inside the MFP 102 to an original condition or an initial setup condition, where the original condition or initial setup condition may be a state established by an entity responsible for manufacturing the MFP 102 or selling the MFP 102.

The license for partial deletion is a license that does not delete a history of a license that contains a transfer history. If the license for deletion is applied, for example, reinstallation of a license that contains a transfer history can be prevented when the user is allowed to continue to use a multifunction peripheral.

FIG. 4 illustrates details of license processing performed inside the MFP 102. The license processing is performed by the time management function unit/license management unit 214 (hereinafter, called the license management unit 214) in FIG. 2.

After the processing is started in step 401, in step 402, license information is input into the license management unit 214. The license information input here will be described in detail with reference to FIG. 5. In step 403, the license management unit 214 checks whether license identifiers are recorded as to functions for which the license of the MFP 102 needs to be installed. The fact that a license identifier is recorded means that the license is installed inside the multifunction peripheral and the use of the target function is validated.

If, in step 403, the license management unit 214 determines that license identifiers are recorded in the MFP 102 (Yes in step 403), the license management unit 214 checks whether there is any installation history of the license. The installation history is a record indicating that the license to validate the target function has been installed on the MFP 102. The presence of an installation history indicates that a customer has installed the license after the MFP 102 is shipped from the factory. If the license management unit 214 determines that there is an installation history of the license (Yes in step 404), in step 405, the license management unit 214 invalidates the installation history and also invalidates the target function by invalidating the license. If it is determined in step 404 that there is no installation history of the license (No in step 404), the license of the target function is already set at a time of factory shipment. Thus, the license management unit 214 proceeds directly to step 406.

If, in step 403, the license management unit 214 determines that no license identifier is recorded in the MFP 102 (No in step 403), in step 408, the license management unit 214 checks whether there is any transfer history. The reason why no license identifier is recorded in the MFP 102 is either no license identifier has been present from the start or the license has been transferred out of the network and thus, no license identifier is present. In step 408, the reason therefor is determined based on whether there is any transfer history. The transfer history is a record indicating that the license has been output out of the MFP 102 or otherwise moved or copied at least in part from the MFP 102. If, in step 408, the license management unit 214 determines that there is no transfer history (No in step 408), the license management unit 214 proceeds to step 406. If, in step 408, the license management unit 214 determines that there is a transfer history (Yes in step 408), in step 409, the license management unit 214 determines whether the license information input in step 402 is a license for restoring factory shipment state or a license for partial deletion. If the license is a license for restoring factory shipment state, in step 410, the license management unit 214 deletes the transfer history. If, on the other hand, the license is a license for partial deletion, the license management unit 214 proceeds to step 406.

In step 406, the license management unit 214 determines whether it has been checked that license identifiers for all functions which need installation of the license of the MFP 102 are recorded. If the license management unit 214 determines that all functions have been checked (Yes in step 406), the license management unit 214 proceeds to step 407 to terminate the present processing. If the license management unit 214 determines that all functions have not been checked (No in step 406), the license management unit 214 returns to step 403.

Figure 5:
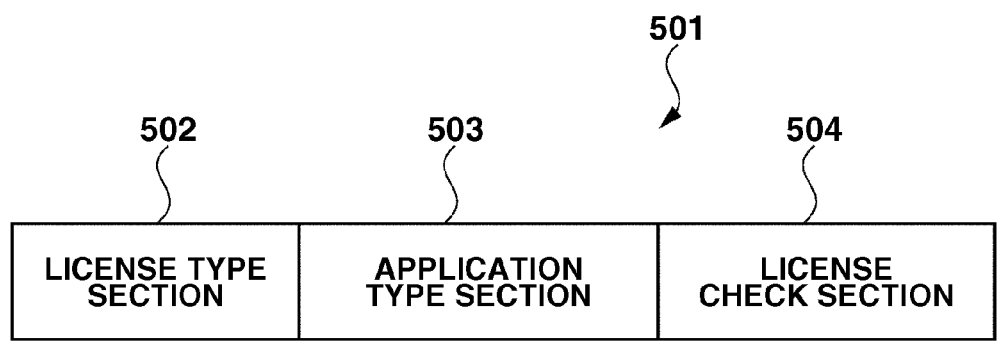
FIG. 5 is a format of the license information according to an exemplary embodiment.

FIG. 5 illustrates a format 501 of license information in the present exemplary embodiment. The flow in FIG. 4 is executed by inputting license information into the MFP 102. A license type section 502 identifies whether license information is a license for restoring factory shipment state, a license for partial deletion, or a license that validates an application (function). The determination in step 409 described above is made based on this license type section. An application type section 503 identifies the application for which the license is intended. A license check section 504 is a sort of key information to check whether license information itself is correct.

According to aspects of the present exemplary embodiment, the following becomes practicable:

A restoration method can be provided, for example, when a problem caused by software or a problem whose cause cannot be determined, arises. If an erroneous license is issued by the license issuing server and installed, an installation history of the license is left on the multifunction peripheral. However, the history can be cleared.

On the other hand, licenses of functions concerning applications or options mounted as standard when purchased, are validated when shipped. Such license information is not invalidated.

When a multifunction peripheral used once such as a refurbished machine (reproducing device) or demonstration machine should be reused, a mechanism to easily restore the state of factory shipment can be provided.

Unauthorized use without license can be prevented by managing on the license issuing server a history clearing a license history in the multifunction peripheral.

When dealing with some trouble, a function of an application should sometimes be invalidated with restrictions. For the prevention of unauthorized use, history information of a transferred application may be left on a multifunction peripheral device while deleting other information.

The MFP 102 has been disclosed as an example of the image forming apparatus. The MFP 102 determines whether the license corresponding to a license identifier is present inside the image forming apparatus through the license management unit 214 based on the license identifier corresponding to the input license information.

If the license is present inside the image forming apparatus, the license management unit 214 as an example of the history determination unit determines whether there is any installation history of the license whose presence has been determined on the image forming apparatus.

If the license management unit 214 determines that there is an installation history, the license management unit 214 invalidates the license and deletes the installation history.

If the license management unit 214 determines that there is no license corresponding to the license identifier inside the MFP 102, the license management unit 214 determines whether there is any transfer history indicating that the license has been transferred. The license management unit 214 is an example of a transfer history determination unit. If the license management unit 214 determines that there is a transfer history, the license management unit 214 determines whether to delete the transfer history based on the input license information. The license management unit 214 is an example of a deletion determination unit As illustrated in FIG. 5, license information includes information indicating one of a license for restoring factory shipment state and a license for partial deletion, as the license type section 502.

According to the present exemplary embodiment, license invalidation and history deletion can automatically be implemented together by inputting license information, so that restoration processing can swiftly be performed after market trouble arise and a refurbished machine can swiftly be set up. Moreover, by a license issuing server issuing license information, a history management of history deletion in an image forming apparatus can be performed, so that the prevention of unauthorized use without license can be realized.

Other Embodiments

The embodiments can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included. In an example, a computer-readable medium may store a program that causes an image forming apparatus to perform a method described herein. In another example, a central processing unit may be configured to control at least one unit utilized in a method or apparatus described herein. Each apparatus, including an image forming apparatus, may be implemented within, include, or otherwise be connected to the central processing unit (CPU), where the CPU is connected to a memory and executes a variety of functions by executing a variety of application programs that are stored in the memory, such as a read only memory (ROM). The ROM may store such information as an operating system, various applications, a control program, and data. The operating system may be the software that controls the allocation and usage of hardware resources such as memory, central processing unit, disk space, and peripheral devices. A random access memory (RAM) may temporarily store the program or the data that is loaded from the ROM. The RAM also is used as a space wherein the CPU executes the variety of programs.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image forming apparatus having a function that is validated by installing a function license, the image forming apparatus comprising:
   a checking unit configured to check, when license information to restore the image forming apparatus to a state of factory shipment is input, whether a function license of a function of the image forming apparatus is installed;
   an installation history determination unit configured to determine, if the checking unit confirms that the function license is installed and the license information to restore the image forming apparatus to the state of factory shipment is input, whether there is any installation history of the function license on the image forming apparatus; and
   a deletion unit configured to invalidate the installed function license and delete the installation history,
   wherein, if the installation history determination unit determines that there is an installation history of the function license on the image forming apparatus, the deletion unit, according to the input license information to restore the image forming apparatus to the state of factory shipment, invalidates the installed function license and deletes the installation history, and
   wherein, if the installation history determination unit determines that there is not any installation history, the deletion unit does not invalidate the function license.

2. The image forming apparatus according to claim 1, further comprising a transfer history determination unit configured to determine, if the checking unit confirms that the function license is not installed, whether there is any transfer history indicating that the function license has been transferred,
   wherein, if the transfer history determination unit determines that there is a transfer history indicating that the function license has been transferred, the deletion unit deletes the transfer history.

3. The image forming apparatus according to claim 2, wherein, if the checking unit confirms that the function license is not installed and the transfer history determination unit determines that there is the transfer history when license information to invalidate the function license without deleting the transfer history is input, the transfer history is not deleted.

4. A method for an image forming apparatus having a function that is validated by installing a function license, the method comprising:
   checking, when license information to restore the image forming apparatus to a state of factory shipment is input, whether a function license of a function of the image forming apparatus is installed;
   determining, if the checking confirms that the function license is installed and the license information to restore the image forming apparatus to the state of factory shipment is input, whether there is any installation history of the function license on the image forming apparatus; and
   invalidating the installed function license and deleting the installation history, according to the input license information to restore the image forming apparatus to the state of factory shipment, if it is determined that there is an installation history of the function license on the image forming apparatus, and
   not invalidating the function license if it is determined that there is not any installation history.

5. A non-transitory computer-readable medium storing a program that causes an image forming apparatus to perform the method according to claim 4.

6. A non-transitory computer readable storage medium on which is stored a computer program for making a computer execute a method for an image forming apparatus having a function that is validated by installing a function license, the method comprising:
   checking, when license information to restore the image forming apparatus to a state of factory shipment is input, whether a function license of a function of the image forming apparatus is installed;
   determining, if the checking confirms that the function license is installed and the license information to restore the image forming apparatus to the state of factory shipment is input, whether there is any installation history of the function license on the image forming apparatus; and invalidating the installed function license and deleting the installation history, according to the input license information to restore the image forming apparatus to the state of factory shipment, if it is determined that there is an installation history of the function license on the image forming apparatus, and not invalidating the function license if it is determined that there is not any installation history.

\* \* \* \* \*